United States Patent

Swearingen

[15] 3,670,995
[45] June 20, 1972

[54] LONGITUDINAL STABILITY CONTROL DEVICE FOR FIXED WING AIRCRAFT

[72] Inventor: Edward J. Swearingen, San Antonio, Tex.

[73] Assignee: Swearingen Aviation Corporation, San Antonio, Tex.

[22] Filed: May 20, 1970

[21] Appl. No.: 38,987

[52] U.S. Cl. .................................................244/80
[51] Int. Cl. .......................................B64c 17/02
[58] Field of Search .............244/80, 77 R, 77 M, 77 D, 76, 244/78, 87, 89, 75

[56] References Cited

UNITED STATES PATENTS 2,964,270  12/1960  Mercier ..................................244/80

*Primary Examiner*—Duane A. Reger
*Assistant Examiner*—Carl A. Rutledge
*Attorney*—Birch, Swindler, McKie & Beckett

[57] ABSTRACT

This device permits the aft center of gravity loading limit of an aircraft to be increased beyond its normal range without reducing the location of the most forward center of gravity loading limit. The means by which this is accomplished comprises an elongated spring member which has one end connected to the underside of the elevator control surface and which has its other end connected to a spring tension adjusting linkage mounted in the aircraft. The adjusting linkage causes the spring to pull the elevator downwardly to increase the nose down pitching moment about the center of gravity of the aircraft when the device senses a nose up pitch attitude, and releases the tension in the spring in response to a nose down condition. The device includes a feedback member which acts to relocate the spring member to hold the elevator in the desired position in order to trim the aircraft for a given center of gravity and airspeed.

9 Claims, 5 Drawing Figures

INVENTOR
EDWARD J. SWEARINGEN

BY
*Birch, Swindler, McKie & Beckett*
ATTORNEYS

INVENTOR
EDWARD J. SWEARINGEN

BY
Birch, Swindler, McKie & Beckett
ATTORNEYS

INVENTOR
EDWARD J. SWEARINGEN

3,670,995

LONGITUDINAL STABILITY CONTROL DEVICE FOR FIXED WING AIRCRAFT

BACKGROUND OF THE INVENTION

1. Field of the Invention

This invention relates to a device for automatically controlling the longitudinal stability of a fixed wing aircraft and more particularly to a device for increasing and decreasing the nose down pitching moment applied by the elevator in response to the pitch attitude of the aircraft.

2. State of the Prior Art

In the design of aircraft structures and controls the development of a system that provides a high degree of longitudinal stability in level flight without the complicated features of an automatic pilot has not been very successful. This problem is particularly acute in high powered, transport type aircraft which have relatively long cabins that require center of gravity envelopes that are substantial in length relative to the length of the cabin. The center of gravity envelope is the distance between the most forward and the most aft flyable center of gravity loading limits for a given aircraft. It has been found that the design location of the most aft center of gravity limit has to be substantially forward to meet aircraft stability requirements which forecloses maximum utilization of the aircraft cabin. This is because the air loads combined with the location of the aft center of gravity limit too far to the rear of the aircraft tend to make the aircraft longitudinally unstable so that the pilot has to constantly correct nose up or nose down pitch attitudes as the airspeed changes. Airspeed is a function of the power setting of the engine and the pitch attitude of the aircraft.

The source of this problem and a partial solution developed in the prior art can best be described by reference to FIGS. 1 and 2 of the drawings wherein FIG. 1 is a side elevational view of a fixed wing transport aircraft showing the significant forces acting on the aircraft while it is trimmed for level flight and FIG. 2 is a side elevational view of the tail portion of a fixed wing aircraft with a type of prior art device connected to the elevator.

Referring to FIG. 1 in normal horizontal flight, the weight of an aircraft 20 loaded for maximum aft center of gravity (MACG) acts downwardly at this center of gravity (c.g.). The airfoils, namely the wings and horizontal tail section, provide upward forces to counteract the aircraft weight.

Wings 22 provide a first upwardly directed force $L_W$ while the horizontal tail section 24, including on each side of the aircraft fuselage a horizontal stabilizer 26, elevator 28 and trim tab 30 provides a second upwardly directed force $L_S$. The elevator 28 is pivotally mounted to the stabilizer 26 by a hinge 32 while the trim tab 30 is pivotally mounted to the elevator 28 by a hinge 34.

While only the locations of the most forward, most aft and normal centers of gravity are illustrated, it should be understood that the center of gravity can be located at any place between the center of gravity limits depending on the loading of the aircraft. In level flight at a fixed power setting and normal center of gravity position for the aircraft's loading, the aircraft is longitudinally stable with both the elevator 28 and the trim tab 30 in their trailing position since the nose up pitching caused by wing force $L_W$ acting about the center of gravity of the aircraft is balanced by the nose down moment caused by the horizontal tail section force $L_S$ acting about the same center of gravity. However, since increases and decreases in power and airspeed change the lift capabilities of the wings and horizontal tail sections thereby causing the aircraft to become longitudinally unstable, the amount of lift $L_S$ can be regulated by the pilot so that it balances the lift force of the wings $L_W$ thereby maintaining the aircraft in level flight.

The lifting force and rotating moment about the center of gravity caused by the horizontal stabilizer 26 is altered by raising or lowering the elevator 28 about its horizontal axis to change the aerodynamic profile of the tail section. The trim tab 30 is deflected by the pilot so that air striking it will cause the elevator 28 to deflect to the position where the tail section provides the desired moment and lift force $L_S$.

In FIG. 1 the aircraft is shown at an aft center of gravity loading and a given power setting. Since the pitching moments about the center of gravity must be balanced for the aircraft to be longitudinally stable, the horizontal tail section 24 must provide a greater lift force than would be required for a normal center of gravity configuration, and as the center of gravity is moved further aft, the lifting force provided by the horizontal tail section 24 must be increased. As explained above, this is achieved by deflecting the trim tab 30 slightly upward (solid lines, FIG. 1) so that when it encounters the airflow it deflects the elevator 28 slightly downward thereby increasing the lift and moment provided by the horizontal tail section.

Similarly, for a forward center of gravity condition the lifting force provided by the horizontal tail section 24 should be less than achieved with the elevator and trim tab in a trailing position. To achieve this the elevator 28 is deflected slightly upward (phantom lines, FIG. 1) by setting the trim tab 30 to a downward deflection.

Therefore, longitudinal stability of a fixed wing aircraft is achieved for various center of gravity positions and power settings by setting the trim tab attached to the elevator so that it is deflected away from its trail position. The trim tab, through the elevator, controls the direction and the amount of lift force applied by the horizontal tail section to balance the lifting force of the wing about the center of gravity of the aircraft thereby maintaining the aircraft in level flight.

As the center of gravity is moved further aft, the aircraft is trimmed by deflecting the elevator to a lower position by setting the trim tab to a greater upward angle relative to the elevator until the aft limit of the center of gravity is reached. The center of gravity, however, cannot be moved so far aft as to require the trim tab to be deflected above its trail position relative to the horizontal stabilizer since then the aircraft will be longitudinally unstable if it goes into a nose up or nose down attitude. This instability will result when the speed of the aircraft is decreased as by the aircraft being placed in a more nose up attitude while at a given power setting thereby reducing the effectiveness of the trim tab and permitting the elevator to rise toward its trailing position. This reduces the lifting force $L_S$ so that the aircraft becomes unstable as the unbalanced pitching moment caused by the wing produces a further nose up movement of the aircraft. Once the nose of the aircraft is shifted upward, it is then necessary for the pilot to apply a force to prevent the nose from coming up still further to prevent the aircraft from stalling.

If the airspeed is increased while the aircraft is at the aft center of gravity configuration and trimmed for level flight as above, the lifting force applied by the horizontal tail section 24 is increased more rapidly than the lifting force caused by the wing so that the aircraft is subjected to a nose down pitching moment. This downward rotation of the nose increases the speed of the aircraft which again increases the rate of nose down rotation and unless the pilot acts to correct this instability, the aircraft will dive.

In the prior art, the problem outlined above has been eliminated to some extent by installation of a spring 40 that is connected between the fuselage at one end and the elevator horn at its other end as shown in FIG. 2. The spring 40 provides a downward force on the elevator 28 in excess of the force that can be applied by the trim tab 30 thereby giving an increased lift and moment potential to the horizontal tail section 24 so that the aft center of gravity limit can be extended rearwardly.

It should be noted that in the prior art device shown in FIG. 2, the trim tab 30 and the elevator 28 are both deflected downwardly so that the trim tab 30 exerts a force on the elevator 28 that is opposite to the force exerted by the spring. Therefore, by adjusting the trim tab to balance the force of the spring, the elevator can be set to trim the aircraft for a given power setting.

One of the disadvantages of this device is that it reduces the limit of the location of the forward most center of gravity acceptable for loading of the aircraft. Since the device is designed primarily for aft center of gravity loadings, it provides the aircraft with a built-in nose down pitching moment which is compensated for by its close proximity to the aft center of gravity limit. However, if the aircraft is at a forward center of gravity load configuration, it is difficult to trim for level flight since the nose down pitching moment cannot be compensated by the nose up pitching moment caused by the wing. Therefore, the pilot must maintain pressure on the elevator control to bring it upward to a trailing or higher position against the force of the spring. As is readily apparent, this feature of the prior art approach is undesirable.

A second disadvantage flowing from use of the prior art device, that is to some extent related to the first problem is that the device adds to the pilot effort necessary to land the aircraft. This problem arises from the nose down pitching moment caused by the spring loaded elevator since during landing the pilot must use sufficient control force to override the spring and air loads to bring the aircraft into a nose up attitude or flare just prior to touchdown.

The proposed device is an improvement over the prior art and avoids its disadvantages inherent therein. Rather than connecting the spring to the fuselage, the spring in the improved control is connected to a mechanism which, when sensing a nose up attitude increases the tension in the spring to lower the elevator and return the aircraft to level flight; and when sensing a nose down attitude, releases the tension in the spring for the elevator to rise and also permitting the pilot to freely control the elevator and thereby the attitude of the aircraft, particularly during landing.

SUMMARY OF THE INVENTION

In general the invention is an improvement over a device for maintaining an aircraft in level flight that includes an elongated resilient member under tension having one end connected to the aircraft elevator and having its other end connected to the fuselage to cause the elevator to be angularly disposed from a trailing position relative to the horizontal stabilizer. The improvement comprises means connected between the elongated resilient member and the fuselage for selectively varying the tension in the resilient member in response to the pitch attitude of the aircraft so that the angular displacement of the elevator is varied to maintain said aircraft in level flight.

The objects of the invention can be best understood by reference to the drawings wherein

DESCRIPTION OF A PREFERRED EMBODIMENT

Figure 1:
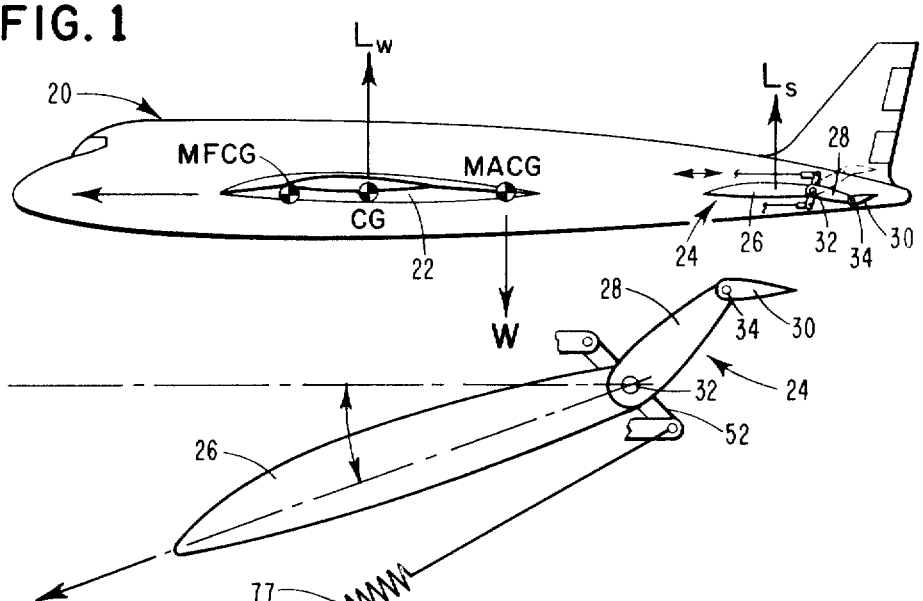
FIG. 1 is a side elevational view of a fixed wing transport aircraft showing the significant forces acting on the aircraft and operable components making up the airfoil of the tail section.

The invention can best be described by reference to FIG. 3 wherein a longitudinal stability control device 50 constructed in accordance with the invention is shown installed in the tail portion of an aircraft 20 adjacent the horizontal stabilizer 26, elevator 28 and trim tab 30. The control is connected to the elevator 28 by way of lower horn 52 at bolt assembly 53 whereby it is operative to deflect the elevator downwardly about hinge 32. Trim tab 30 hingedly connected at 34 to the trailing edge of elevator 28 is positioned by control means (not shown) which are well known in the art.

An upper elevator horn 54 which extends a short distance above the elevator 28 has a suitable control cable 55 connected to it by bolt assembly 56 while a second cable 57 is connected to the lower elevator horn 52 by bolt assembly 53. The elevator is deflected downwardly either by the pilot operating control cable 57 or by means of the control device 50. It is deflected upwardly by the pilot operating control cable 55.

The control device 50 preferably includes a support member 58 extending between aircraft fuselage frames 59 and 60 adjacent the skin 61 of the aircraft 20. The support member 58 has a generally triangular configuration having its base along the skin 61 and having its apex 62 intermediate the frames to permit free movement of members of the control linkage that are pivotally connected thereto.

The control linkage includes an elongated member forming a control arm 63 provided with a boss 64 having a suitable bushing opening 65 whereby it is pivotally mounted on a pin 66 fixedly carried by support member 58. The location of bushing opening 65 along the length of arm 63 is determined so that arm 63 is divided into a first relatively short segment 68 having a rounded end 69 and a second relatively long segment 70 having a rounded end 71.

Figure 3:
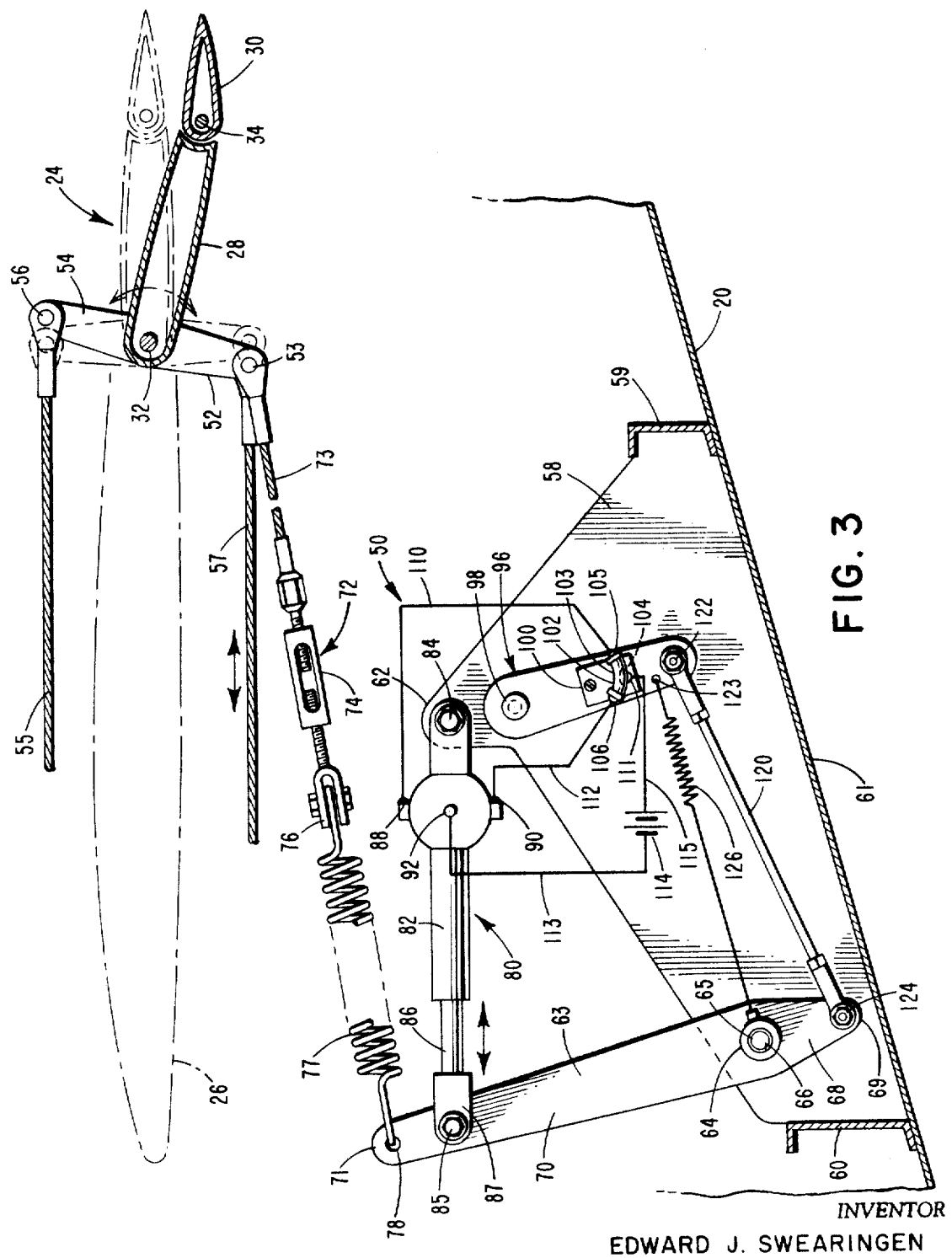
FIG. 3 is a side view with parts shown in section of a device constructed in accordance with the invention shown installed in the tail portion of an aircraft for elevator control.

A suitable cable assembly means 72 being both flexible and resilient has one end fastened to the lower elevator horn 52 at bolt assembly 53 and has its other end connected to the rounded end 71 of control arm 63 so that counterclockwise movement (as seen in FIG. 3) of control arm 63 about pivot pin 66 causes the elevator 28 to be urged toward a downwardly deflected position. Preferably cable assembly means 72 includes a flexible cable section 73 connected to a turnbuckle adjusting member 74 which is in turn connected by a double shear connection member 76 to one end of a suitable yieldable member such as spring 77. In the embodiment of the invention illustrated, the spring 77 has one end connected to a suitable opening 78 in rounded end 71 of the relatively long segment 70 of control arm 63. While the arrangement of elements is to be preferably in the order illustrated they can be arranged in any convenient order since the function of elongated cable assembly means 72 is substantially uneffected thereby.

An extensible member such as an electrically operable screw actuator 80 includes a cylinder 82 pivotally connected to support member 58 by bolt assembly 84. The cylinder receives an extendable rod 86 that has its free end 87 pivotally connected by bolt assembly 85 to control arm 63 slightly below opening 78. The actuator 80 contains an electric drive motor provided with three electric terminals 88, 90 and 92, which are connected by suitable electric circuit means to a pitch attitude sensing device as will be more fully explained hereinafter. Selective energizing of the drive motor through terminals 88 or 90 causes rod 86 to move in or out respectively, relative to cylinder 82. As well known, this electric extensible actuator 80 can be of the type having a threaded nut member engaged with an externally threaded screw member with the drive motor being energized in one or the other directions of its rotation to rotate the nut member and extend or retract rod 86 through the screw member, the screw member moving out or in depending on the direction of rotation of the drive motor. Terminal 92 provides a common electrical terminal to complete the circuit path from the power source to the drive motor.

Switch arm 96 is an elongated generally flat member which is pivotally connected by a pin 98 to the support member 68 slightly below bolt assembly 84. The switch arm, which is in depending relation to pin 98, carries a plate 100 which supports a gravity actuated switch 102. Preferably the switch is a single throw, double pole mercury switch although a suitable gravity type switch might be one operated by a pendulum or other gravity responsive means. Switch 102 comprises an enclosed flowable conductive material operable to selectively energize terminal 88 or 90 of actuator 80 in response to the pitch attitude of the aircraft. As illustrated, the switch 102 includes an arcuate section 103 of tubular nonconductive material secured on the switch plate 100 so that its ends are higher than its midportion. A bead of electrically conductive flowable material in the tube, such as mercury, 104 normally reposes at the midportion under the effect of gravity. The tubular section 103 has electrically conductive end members that comprise terminals 105 and 106. A common terminal 111, located at the midportion of the tubular section on the lower side thereof, extends through the tube wall so that it can contact the bead of mercury. Terminal 105 is connected to terminal 88 on the electric extensible actuator 80 by line 110 while terminal 106 is connected to terminal 90 on the actuator by line 112. Common terminal 111 is connected by a suitable wire 115 to a suitable source of electrical power 114 which is in turn connected by wire 113 to common terminal 92 of the actuator 80.

The mercury should be present in sufficient quantity so that the bead 104 formed thereby can simultaneously close a circuit by contacting terminals 111 and 105 or terminals 106 and 111.

An elongated feedback rod 120 having one end pivotally connected to the free end of switch arm 96 by pin 122, has its other end connected to end 69 of control arm 63 by pin 124. Elongated coil spring 126, connected to the switch arm in close proximity to pin 122 at hole 123 and to the control arm 63 at boss 64, functions as an anti-backlash device to prevent the various parts of the linkage from shifting from their preferred relationship because of normal tolerances in the connections between the various elements.

The stability control device is operable to automatically vary the downward deflection of the elevator 28 relative to the horizontal stabilizer 26 in response to the pitch attitude of the aircraft as such attitude is sensed by switch 102. The feedback rod 120, moving in response to movement of control arm 70, is operable to relocate switch 102 and to stop extension or retraction of extendable rod 86 of actuator 80 as the aircraft attains longitudinal stability.

The manner of operation of the invention can best be described by reference to FIGS. 3, 4, and 5.

In FIG. 3 the horizontal tail section 24 of an aircraft 20 and specifically elevator 28 and trim tab 30 are shown in solid lines trimmed for level flight at an extreme aft center of gravity configuration and at a given power setting. The trim tab 30 has been deflected slightly above the elevator thereby deflecting the elevator 28 downwardly. This gives increased nose down pitching moment about the center of gravity of the aircraft to compensate for the large nose up moment caused by the wing force Lw. In this configuration spring 77 is slightly tensed to take up the slack in cable assembly means 72. The bead of mercury is in the center of tube 102 so that neither of the circuits to electrical actuator 80 are energized and the drive motor of the actuator is inoperative.

Figure 4:
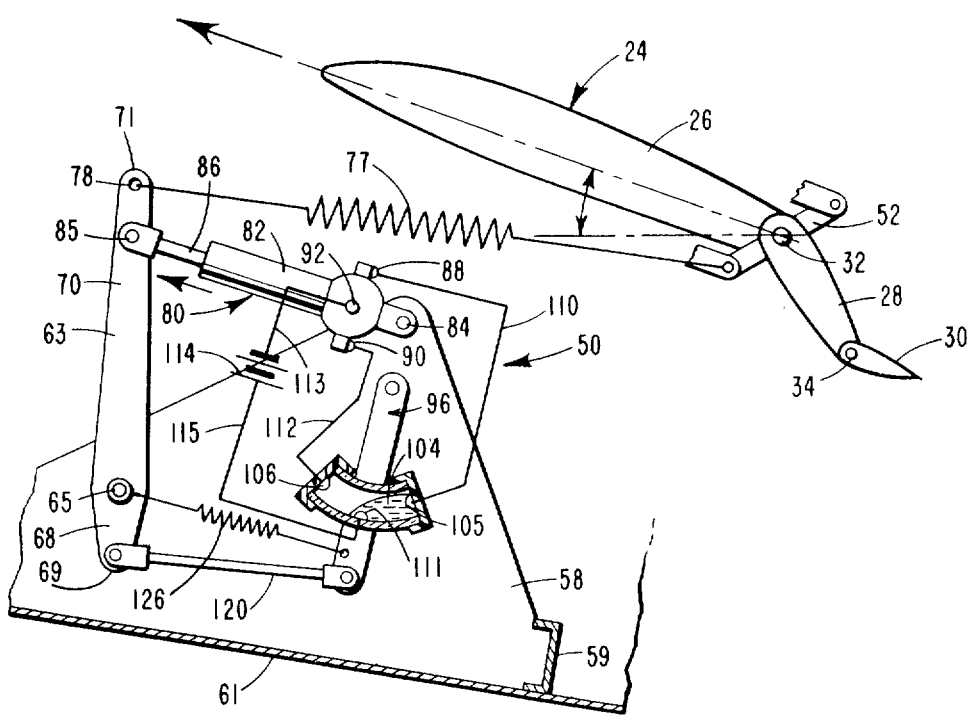
FIG. 4 is a side view with parts in section of the device illustrated in FIG. 3 when the aircraft in which it is installed is in a nose up attitude.

If at the above defined configuration the aircraft were to rotate into a nose up attitude due to some longitudinal instability, the control would assume the position shown in FIG. 4. There it can be seen that the switch arm 96 has rotated through the same angle as the nose up angle of the aircraft causing the bead of mercury 104 to shift rearwardly in the tubular section 102 to contact both end terminal 105 and common terminal 111. This completes a circuit from power source 114, line 115 through terminal 111, terminal 105 and line 110 to terminal 88 the actuator 80. The return path is through common line 113 to the aircraft's source of electrical power shown schematically at 114. This circuit energizes the actuator 80 and causes rod 86 to be extended whereby control arm 63 is rotated counterclockwise and the tension in spring 77 is increased. This applies a force tending to increase the downward deflection of elevator 28 to the position shown in FIG. 4 so that the lifting force and moment effect of the horizontal tail section 24 is rapidly increased so that there is a resulting nose down pitching moment to lower the nose of the aircraft. As control arm 63 rotates counterclockwise with the extension of rod 86, switch arm 96 is subjected to a counterclockwise rotation through feedback rod 120, thereby causing the bead of mercury 104 to fall away from terminal 105 thereby breaking the circuit to the actuator 80 and stopping movement of rod 86 in its extended position. Thus, the elevator 28 is urged by spring 77 to be held in its deflected position until the aircraft returns to level flight as will be more fully explained.

Figure 5:
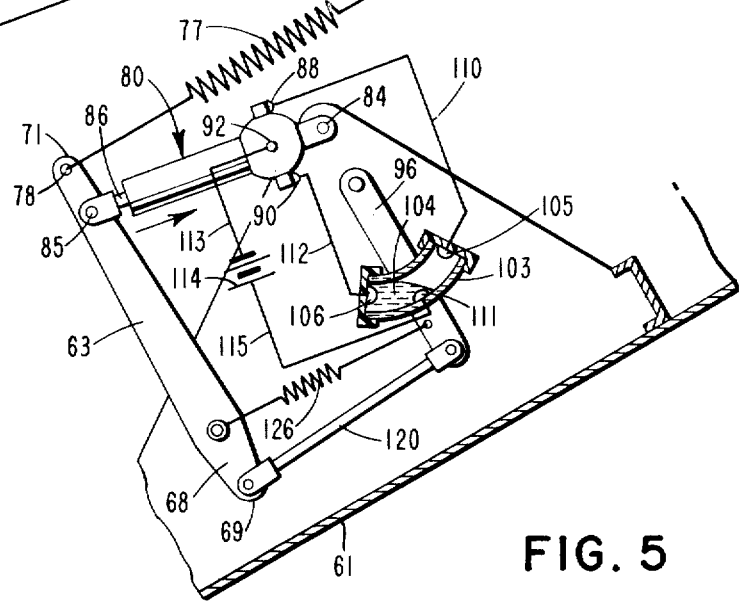
FIG. 5 is a side view with parts in section of the device illustrated in FIG. 3 when the aircraft in which it is installed is in a nose down attitude.

Returning again to FIG. 3 where the solid lines show the aft controls arranged for level flight at an aft center of gravity configuration, if the aircraft is subjected to a nose down rotation about its center gravity the longitudinal stability control reacts as shown in FIG. 5. There it can be seen that switch arm 96, by virtue of its being connected to the aircraft, has rotated through the same angle as the nose down angle of the aircraft causing the bead of mercury 104 to shift forward in the tube so that it contacts both end terminal 106 and common terminal 111. This completes a circuit from power source 114, line 115 through terminal 111, terminal 106 and line 112 to the terminal 90 of electric actuator 80. The return path is through common line 113 to the aircraft's source of electrical power shown schematically at 114.

This circuit energizes the actuator 80 to cause rod 86 to be retracted into the cylinder 82 whereby control arm 63 is subject to a clockwise rotation to reduce the tension in spring 77. Since the tension in the spring thus becomes minimal, the elevator tends to rise under the airflow loads, and further, the pilot, by his own effort, can freely raise elevator 28 above the trail position to correct the nose down attitude of the aircraft, a feature particularly important in landing the aircraft. It should be observed in this context that in the nose down attitude the retraction of the rod 86 causes the pitch arm 96 to rotate by reason of feedback rod 120, in a clockwise direction thereby breaking the circuit between switch terminals 111 and 106 to deactivate the actuator 80 and hold the control arm 63 and free the elevator to assume a position permitting the aircraft to return to level flight as will be more fully explained.

A further aspect of the invention is that if the control, while correcting a nose up attitude, causes the nose to rotate through the horizontal and then down, the pilot can return the aircraft to level flight by a simple adjustment of his controls. On the other hand, if while correcting a nose down pitch attitude, the aircraft were to rotate past the horizontal, the automatic control is energized to return the aircraft to level flight.

Figure 2:
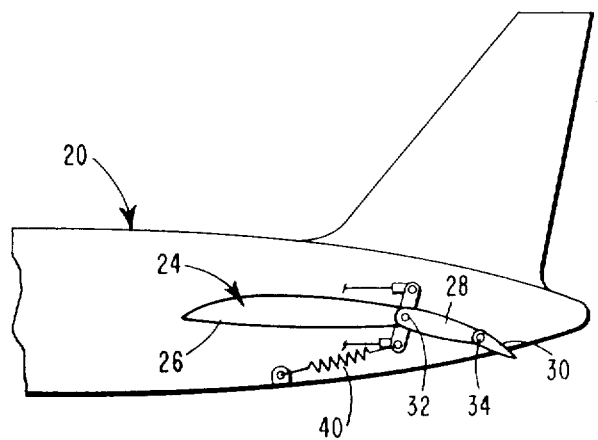
FIG. 2 is a side elevational view of the tail portion of a fixed wing aircraft showing a prior art approach to control of the aircraft elevator.

Thus the invention described herein is an improvement over the prior art spring type device (FIG. 2) since in addition to providing longitudinal stability it permits an increased aft center of gravity limit in an aircraft with a relatively long cabin without restricting the forward center of gravity limit. Furthermore, while providing the above noted advantages, the landing of the aircraft is not impeded as in the prior art device since with that device when the pilot flares the aircraft for landing he not only has to pull against the ordinary air loads on the controls, but in addition he has to pull against the force of the spring thereby being required to exert an additional effort over that which would ordinarily be required. This problem is avoided in the subject invention since the control does not tense the spring 77 when the aircraft is in a nose down attitude during a landing approach so that the pilot can deflect the elevator upward to flare the aircraft as though the spring were not present.

While the invention has been described with particular reference to the embodiment illustrated and described in detail in the specification, it should be understood that many modifications of this device would be obvious to those skilled in the art in light of the foregoing specification and drawings. Therefore, the scope of the invention should not be limited by the foregoing detailed description of a preferred embodiment but rather should be limited only by the scope of the claims appended hereto.

I claim:

1. In a device for maintaining an aircraft in level flight of the type including a resilient member having one end connected to a generally horizontally disposed aircraft control surface that is pivotally mounted to an airfoil on said aircraft and having its other end connected to a stationary portion of said aircraft whereby said aircraft control surface is urged to be angularly displaced relative to said airfoil, the improvement comprising means interposed between said resilient member and said stationary portion for selectively varying the tension in said resilient member in response to the pitch attitude of said aircraft whereby the forcing urging said angular displacement of said control surface is varied to maintain said aircraft in level flight.

2. A device as defined in claim 1 wherein said means for selectively varying the tension includes pitch attitude sensing means mounted on said aircraft, said sensing means including means for creating a first signal in response to a nose up pitch attitude; and linkage means carried by said aircraft and connected to said resilient member, said linkage means including signal responsive means operative to increase the tension in said resilient member in response to said first signal so that said control surface is urged toward an increased angular displacement.

3. A device as defined in claim 2 wherein said linkage means comprises an elongated control arm pivotally connected to said aircraft and having one end connected to said resilient member; and said signal responsive means comprises an extensible actuator operatively connected between said aircraft and said elongated control arm so that said first signal causes said extensible actuator to move said control arm in a first direction to increase the tension in said resilient member.

4. A device as defined in claim 2 wherein said pitch attitude sensing means includes means for creating a second signal in response to a nose down pitch attitude; and said signal responsive means is operative to reduce the tension in said resilient member in response to said second signal so that angular displacement of said control surface can be reduced.

5. A device as defined in claim 4 wherein said linkage means comprises an elongated control arm pivotally connected to said aircraft and having one end connected to said resilient member; and said signal responsive means comprises an extensible actuator operatively connected between said aircraft and said elongated control arm so that said second signal causes said extensible actuator to move said control arm in a second direction to reduce the tension in said resilient member.

6. A device as defined in claim 2 wherein said pitch attitude sensing means is pivotally connected to said aircraft;

said linkage means includes an elongated control arm pivotally connected to said aircraft and having one end connected to said resilient member; and feedback means interconnected between said control arm and said pitch attitude sensing means for terminating said first signal so that said control surface is urged to remain at the angular displacement to which it moved by said signal responsive means.

7. A device as defined in claim 1 wherein said means for selectively varying the tension includes a control arm pivotally connected to said aircraft, said resilient member being connected to one end of said control arm;

energizable means for moving said control arm about said pivotal connection; and normally open switch means electrically connected to said energizable means, said switch means being closable in response to a change in said pitch attitude of said aircraft to energize said energizable means to vary the tension in said resilient member.

8. A device as defined in claim 7 wherein said switch means includes an elongated arm pivotally connected at one end to said aircraft;

a housing having first and second end portions and an intermediate elongated curved section mounted on said elongated arm so that said ends are higher than said intermediate portion, said ends being in electrically conductive relation with the interior of said housing;

conductive means in said intermediate portion of said housing in electrically conducting relation with the interior of said housing, and a quantity of flowable electrically conductive material sufficient to complete a circuit between one of said conductive ends and said conductive means at said intermediate portion normally disposed at said intermediate portion of said housing and being operable to complete a circuit between one of said conductive ends and said conductive means in said intermediate portion in response to a change in said pitch attitude whereby said normally open switch is closed.

9. A device as defined in claim 8 including feedback means comprising an elongated member connected between said control arm and said elongated arm so that movement of said control arm when said normally open switch is closed swings said elongated arm to return said flowable conductive material to said intermediate portion to open said switch.

* * * * *